BLANKING CIRCUITS FOR TELEVISION RECEIVERS

Filed April 18, 1966 2 Sheets-Sheet 1

INVENTOR.
DONALD H. WILLIS
BY Eugene M. Whitacre
Attorney

INVENTOR.
DONALD H. WILLIS
BY Eugene M. Whitacre
Attorney

United States Patent Office 3,414,669

Patented Dec. 3, 1968

3,414,669
BLANKING CIRCUITS FOR TELEVISION RECEIVERS

Donald H. Willis, Indianapolis, Ind., assignor to Radio Corporation of America, a corporation of Delaware Filed Apr. 18, 1966, Ser. No. 543,130
8 Claims. (Cl. 178—7.5)

ABSTRACT OF THE DISCLOSURE

A circuit for applying retrace blanking pulses to a low impedance point in television receivers. Means are provided to forward bias a rectifier, serially coupled between source of composite video signals and a video amplifier stage, to normally conduct. A blanking pulse occuring during retrace interval, sufficient in amplitude and polarity, is applied to the junction of the rectifier to render it non-conductive and to insure complete blanking of the television picture tube.

This invention relates to retrace blanking circuits for television receivers.

In television receivers, if the electron beam is not turned off during the horizontal and vertical retrace intervals, the image reproduced by the picture tube may be adversely affected. For example, if the electron beam is not suppressed during the vertical retrace interval, diagonal lines may be superimposed on the image reproduced by the picture tube. This problem is of particular concern in color television receivers wherein spurious colors may be produced during vertical and horizontal blanking intervals unless the electron beam is suppressed.

Retrace blanking circuit heretofore devised apply a blanking pulse derived from the receiver deflection circuits to a suitable point in the television receiver to effect electron beam suppression during the retrace interval. Under certain conditions it is desirable to apply the blanking pulse to a point in the receiver which may have a low impedance to reference potential or ground at the blanking pulse frequency. For example in color television receivers a low impedance point where the blanking pulses may be applied is at the control electrode circuit of a video amplifier stage which is driven by a low impedance delay line. In order to develop blanking pulses of sufficient amplitude across such a low impedance circuit, either the deflection circuits must be designed to provide the power required, or an additional amplifier stage for the blanking pulse is required. In either case, it is possible that the blanking pulse may adversely affect the operation of circuits preceding the circuit to which the blanking pulses are applied.

It is an object of the present invention to provide an improved retrace blanking circuit for television receivers.

It is another object of the present invention to provide an improved circuit for applying retrace blanking pulses to a low impedance point in television receivers which is relatively simple in construction and economical to manufacture.

In accordance with the invention a rectifier is serially coupled between a low impedance source of composite video signals and a video amplifier stage, with the rectifier being poled for increased conduction in response to the synchronizing signal components. Means are provided to forward bias the rectifier such that it normally presents a conductive path to the video signals. A blanking pulse signal occuring during the retrace interval, such as the vertical retrace interval, is applied to the junction of the rectifier and the video amplifier stage. The blanking pulse is sufficient in amplitude and polarity to render the rectifier non-conductive to decouple the low impedance video signal source from the video amplifier stage during the retrace interval, thus minimizing any loading of the blanking pulse signal by the video signal source impedance, and to provide sufficient drive for the video amplifier stage to insure complete blanking of the television picture tube.

In accordance with a feature of the invention, both vertical and horizontal blanking may be achieved by deriving pulse signals coincident with the retrace intervals of the vertical and horizontal deflection waveforms respectively and applying said signals to the rectifier and video amplifier stage junction such that the video amplifier stage is cut-off during both the vertical and horizontal retrace intervals.

The novel features that are considered characteristic of the invention are set forth with particularity in the appended claims. The invention itself, however, both as to its organization and method of operation will best be understood when read in connection with the accompanying drawings, in which:

The blanking circuit of the invention will be described in the context of a color television receiver. It is to be understood, however, that the circuit of the invention is equally adaptable for use in black and white or monochrome receivers as well as color receivers.

Figure 1:
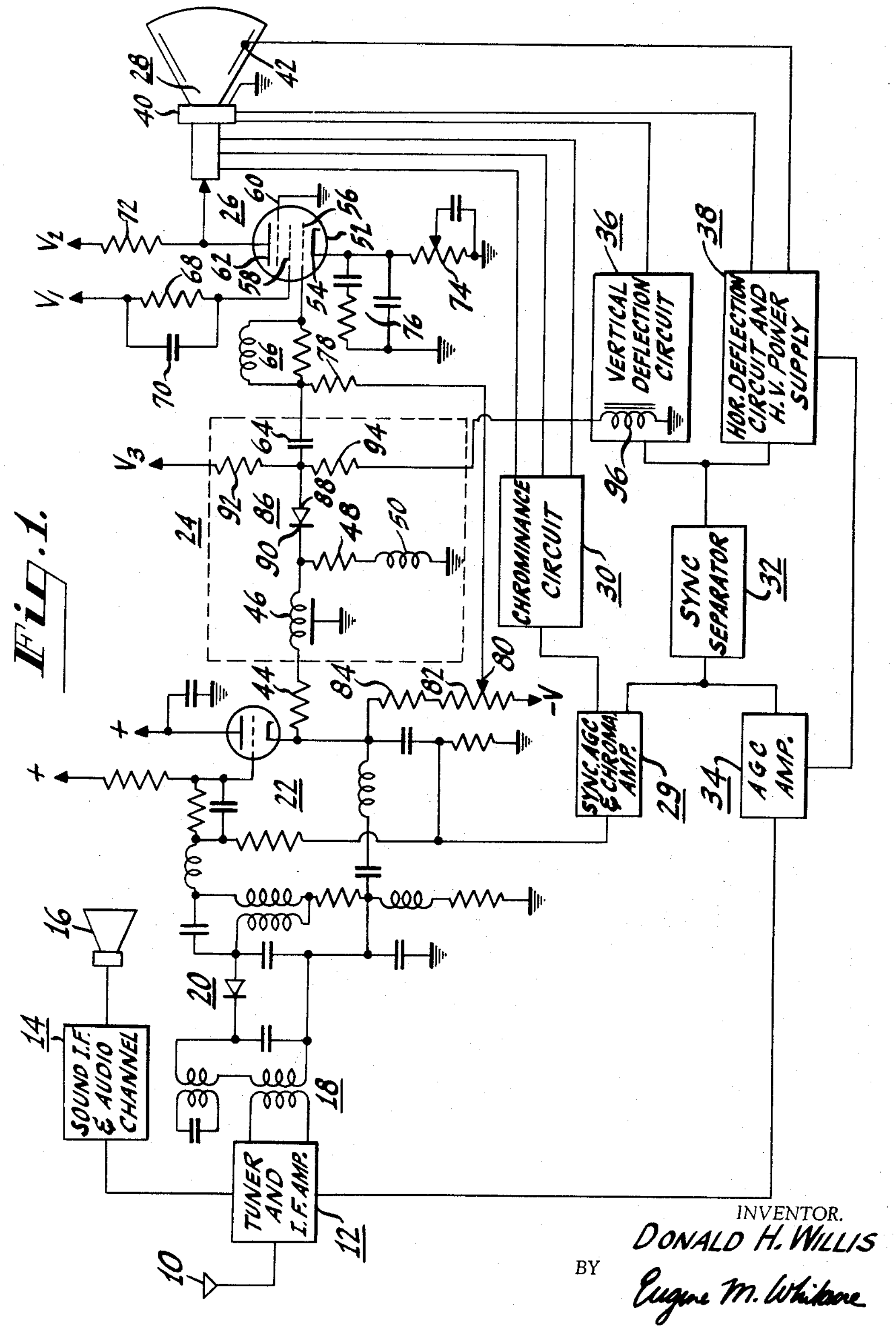
FIGURE 1 is a schematic circuit diagram partly in block form, of a color television receiver embodying the blanking circuit of the present invention.

Referring now to the drawings, wherein like parts are indicated by like reference numerals in all figures, and referring in particular to FIGURE 1, a color television receiver includes an antenna 10, which is coupled to a tuner—I.F. amplifier 12. The tuner may include as is known, a radio frequency (R.F.) amplifier, mixer and oscillator stages for amplifying and converting received radio frequency signals to corresponding intermediate frequency (I.F.) signals, and an intermediate frequency amplifier for amplifying the I.F. signals. An intercarrier sound signal is derived at an output of the intermediate frequency amplifier and supplied to the sound I.F. amplifier and audio channel 14 so as to reproduce the sound accompanying the picture signal in a loudspeaker 16. The amplified I.F. signal is coupled by means of a transformer 18 through a video detector circuit 20 to a video amplifier stage 22.

The output of the video amplifier stage 22 is coupled through a delay line and blanking circuit 24 (shown enclosed in a the dashed rectangle and to be described hereinafter) to a second video amplifier or video output stage 26 and then to the cathode electrodes (not shown) of a color picture tube 28. It will be noted that in the detector circuit 20, the diode is poled to detect the negative envelope of the composite video signal so that the signal output of the video amplifier stage 22 has its synchronizing pulse excursions in the negative direction. The output of the video amplifier stage 22 is also applied through a sync, AGC, and chroma amplifier 29 to a chrominance circuit 30, and sync separator circuit 32 for processing of the component parts of the video signal to effect a visual display in the color picture tube 28 in accordance with known techniques. An automatic gain control (AGC) amplifier 34 is also coupled to the output of the amplifier 29 to develop and supply gain control signals to the tuner and I.F. amplifier 12.

For example, the sync separator circuit 32 serves to separate the deflection synchronizing components from the composite video signal in accordance with well-known amplitude selective techniques. These synchronizing components are applied to vertical deflection circuit 36 and horizontal deflection and high voltage power supply circuit 38 to synchronize the development therein of suitable vertical and horizontal deflection waveforms each having a relatively long scanning portion and relatively short retrace portion for application to the appropriate deflection yoke elements 40 which surround the neck of the picture tube 28. As is known, the scanning and retrace portions of the horizontal deflection waveform are of considerably shorter time duration than the respective scanning and retrace portions of the vertical deflection waveform. In addition the horizontal deflection and high voltage power supply circuit 38 supplies the necessary high voltage required by the anode 42 of the color picture tube 28.

The chrominance section 30 includes a pulse amplifier, color demodulators, and other circuitry known in the art to synchronize and detect the color information of the composite video signal and then apply said color information to appropriate grids of the picture tube 28.

The foregoing circuitry may for example correspond to that used in the CTC–19 color television receiver chassis manufactured by the Radio Corporation of America and shown in the RCA Service Data Pamphlet 1965, No. T 13, published by RCA Sales Corporation, 600 N. Sherman Drive, Indianapolis, Ind.

Referring now to circuits 24 and 26 of FIGURE 1, the video signal output of amplifier stage 22 is coupled through a resistor 44 and delay line 46 by means later to be described, to the input circuit of the video amplifier stage 26. The delay line 46 has a relatively low impedance, as for example 600 ohms and is designed to have a reasonably uniform amplitude response over the frequency range of the luminance information portion of the video signal. The line 46 is terminated at its end remote from resistor 44 by a resistor 48 in series to ground with an inductor 50 so as to minimize reflections that might tend to destroy fidelity of translation of the luminance information through the line. The electrical length of the line 46 is chosen so as to impart a time delay to the luminance information passing therethrough which substantially equals the normal time delay imparted to signals processed through the chrominance section 30 of the color television receiver.

The video amplifier stage 26 may include a pentode tube 52 having cathode, control grid, screen, suppressor, and plate electrodes 54, 56, 58, 60 and 62 respectively. The luminance signals are applied to the control grid 56 through a D.C. blocking capacitor 64 in series with a video peaking network 66. Screen electrode 58 is connected through a resistor 68 to a source of screen operating potential $V_1$. Resistor 68 is bypassed at signal frequencies by a capacitor 70. The suppressor electrode 60 is grounded, and the plate electrode 62 is connected through a plate load resistor 72 to a source of operating potential $V_2$. The cathode electrode 54 is coupled through a potentiometer 74 to ground. Potentiometer 74 may also serve as a contrast control in the TV receiver. Connection is also made from a cathode 54 through a video peaking network 76 to ground. A brightness control circuit for the receiver comprises a pair of series resistors 82 and 84 connected from the cathode of the video amplifier stage 22 to —V with an adjustable contact 80 on the resistor 82 connected through resistor 78 and network 66 to the control grid 56.

In accordance with the invention, a rectifier 86 is serially connected in the video signal path coupling the video amplifiers 22 and 26. The cathode 90 of the rectifier 86 is connected to the delay line 46 and the rectifier anode 88 is connected to a source of positive potential $V_3$. A negative retrace pulse developed across a winding 96 of a vertical output transformer during the retrace interval of the vertical deflection waveform is applied through a resistor 94 to the anode 88 of the rectifier 86.

During the vertical scanning interval, the rectifier 86 is forward biased by the supply $V_3$, with forward biasing current predominately flowing from ground through inductor 50, resistor 48, rectifier 86, and resistor 92 to the supply $V_3$. In the forward biased condition, the rectifier presents a very low series impedance in the video signal path between the delay line 46 and the video amplifier 26. Since the resistor 94 is large relative to the impedance looking back through the diode toward the video amplifier 22, the scanning wave from the vertical deflection circuit 36 is effectively isolated from the video signal path, and very little of the scanning wave is superimposed on the video signal.

During the vertical retrace interval, a large negative pulse (retrace pulse) is produced by the vertical deflection circuit across the winding 96 of the vertical output transformer. This pulse is applied through the resistor 94 to the anode 88 of the rectifier 86. The resistors 92 and 94 are proportioned so that the negative pulse overcomes the forward bias on the rectifier 86, causing it to become non-conductive and present a high impedance in the video signal path between the delay line 46 and the video amplifier 26. Thus, during the vertical retrace interval, and due to the high impedance of the rectifier, the transformer winding 96 is effectively decoupled from the video signal path so as to prevent loading of the negative pulse by the low impedance of the delay line and output circuit of the video amplifier stage 22. The negative pulse developed at the junction of resistors 92 and 94 is coupled to the video amplifier stage 26 through capacitor 64 and peaking network 66 and drives the grid electrode 56 sufficiently negative with respect to the cathode 54 so as to cutoff the amplifier tube 52 and cause the voltage on the plate electrode 62 to rise in the positive direction toward the potential of $V_2$. The rising plate voltage is coupled to the cathodes (not shown) of the color picture tube 28 to suppress or cutoff the electron beams therein and thereby blank said picture tube during the vertical retrace interval, thus preventing the appearance of vertical retrace lines in the displayed image. The time interval during which the tube is cutoff and blanking is effectuated is determined by the resistors 92 and 94, the forward bias on the rectifier 86, the amplifier tube 52 characteristics and operating bias, and the magnitude and rate of decay of the retrace pulse.

When the retrace pulse has decayed to a point where the rectifier is again forward biased, the video signal is again transmitted to the video amplifier stage 26.

Figures 2, 3:
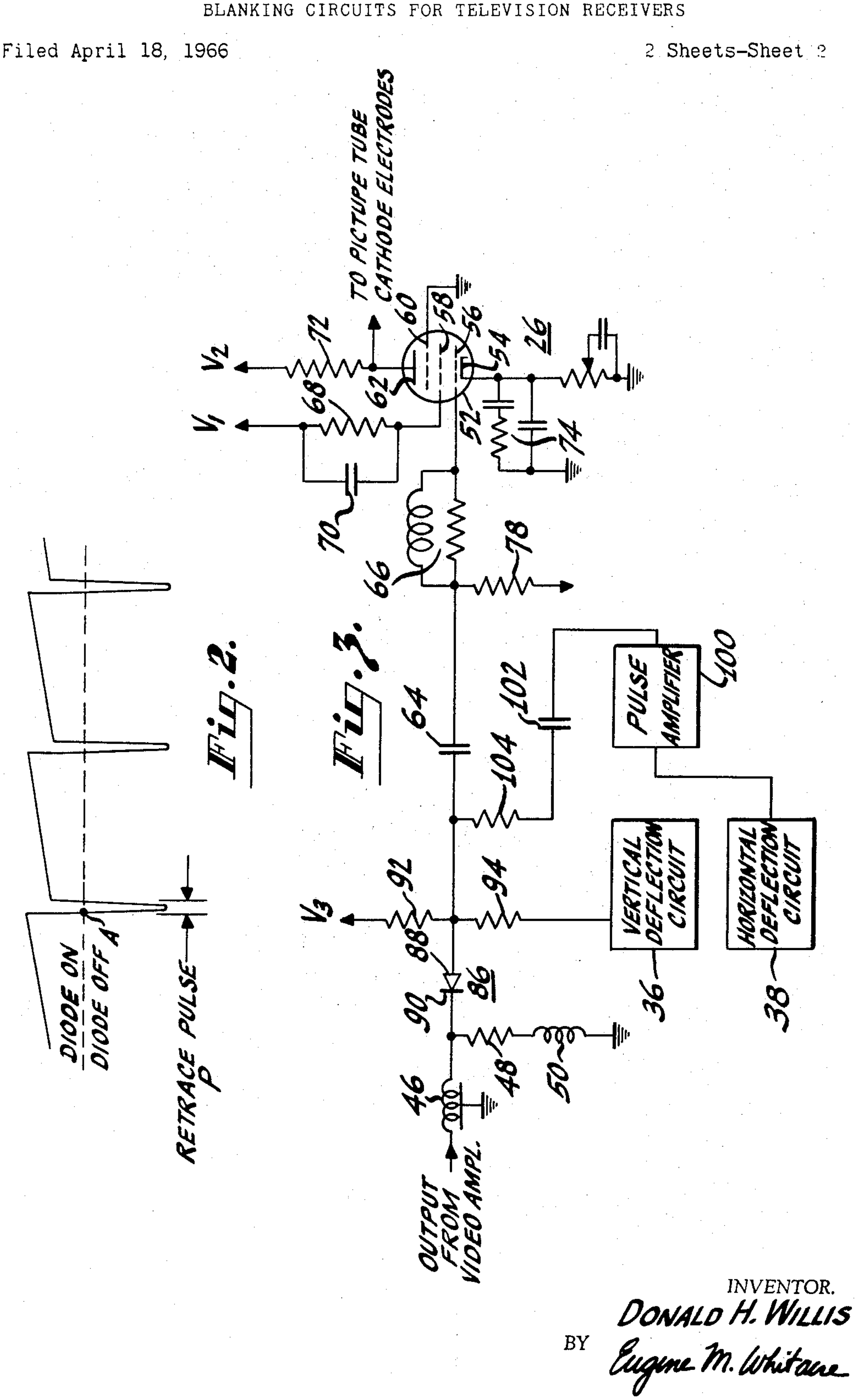
FIGURE 2 is a waveform diagram useful in illustrating the operation of the blanking circuit shown in FIGURE 1.
FIGURE 3 is a schematic circuit diagram illustrating another embodiment of the present invention as applied to the receiver shown in FIGURE 1.

In FIGURE 2, there is illustrated a voltage waveform derived from the vertical deflection circuit and appearing across the secondary winding 96 of the vertical output transformer. At some point A determined by the bias potential $V_3$, resistors 92 and 94 and the magnitude of the pulse, the rectifier 86 is rendered non-conductive, leaving a negative pulse portion P which is applied to the video amplifier stage 26 to cutoff tube 52 during vertical retrace.

A particular set of values of the circuit portion 24 of FIGURE 1 which has provided satisfactory operation is set forth below. It will be appreciated that these values are given by way of example only.

| | |
|---|---|
| Resistor **48** | 680 ohms. |
| Resistor **92** | 560K ohms. |
| Resistor **94** | 15K ohms. |
| Inductor **50** | 27 $\mu$h. |
| Capacitor **64** | 0.1 $\mu$f. |
| Rectifier **86** | Fairchild semiconductor Type FD222. |
| Bias voltage $V_3$ | +405 volts D.C. |

The remaining component values and circuit details of FIGURE 1 may conform to the details of the corresponding components of the aforementioned CTC19 color television receiver chassis.

Referring now to FIGURE 3 of the drawings, there is shown a modification of the vertical blanking circuit portion of FIGURE 1, including both a vertical and a horizontal blanking circuit constructed in accordance with the invention. Reference numerals identical to those in FIGURE 1 indicate corresponding components.

Vertical blanking is accomplished during the vertical retrace interval by coupling a negative pulse from the vertical deflection circuit 36 through resistor 94 to the anode 88 of the forward biased rectifier 86, whereby the rectifier is rendered non-conductive to the video signal and the tube 52 is driven into cutoff. The circuit operates in a manner similar to that described for the circuit of FIGURE 1.

For blanking during the retrace interval of the horizontal deflection waveform, a negative going pulse obtained during the horizontal retrace interval is coupled to the anode 88 of the rectifier 86. In the illustrated embodiment the negative going pulse is obtained from a pulse amplifier 100 and is coupled through a capacitor 102 in series with a resistor 104 to the anode 88 of the rectifier 86. The pulse amplifier 100 is coupled to a horizontal output transformer in the horizontal deflection circuit 38. The pulse amplifier 100 and horizontal deflection circuit 38 may be similar to that described in the aforementioned CTC19 color television receiver chassis, with the pulse amplifier comprising the "Blanker" stage shown therein.

What is claimed is:

1. In a television receiver including a source of video signals containing deflection synchronizing components, apparatus for producing in response to said synchronizing components a deflection waveform having a relatively long scanning interval and relatively short retrace interval, and a video amplifier stage coupled to a television picture tube, the combination of:

- a rectifier connected between said source of video signals and said video amplifier stage, said rectifier being poled for increased conduction in response to said synchronizing components;
- means biasing said rectifier to normally present a conductive path to said video signals;
- means coupled to said deflection waveform producing apparatus for deriving a pulse signal during the retrace interval of said deflection waveform; and
- means applying said pulse signal to the junction of said rectifier and said video amplifier stage for rendering said rectifier non-conductive to said video signals during the retrace interval of said reflection waveform and causing said video amplifier stage to develop a signal for blanking of said television picture tube.

2. The combination defined in claim 1 wherein said source of video signals is of a first relatively low impedance, and wherein said means for applying said pulse signal to the junction of said rectifier and said video amplifier is of a second high impedance relative to said first impedance whereby said deflection waveform producing apparatus is effectively isolated from said source of video signals and said video amplifier stage during said scanning interval.

3. The combination defined in claim 2 wherein said means for biasing said rectifier includes a source of direct potential and a resistor connected between said source of direct potential and the junction of said rectifier and said video amplifier, said source of direct potential, said source of video signals, said rectifier and said resistor providing a direct current circuit for biasing said rectifier to present a low impedance to the transfer of video signals during the scanning interval of said deflection waveform, the ratio of said resistor to said second high impedance being of a value to develop sufficient pulse voltage during the retrace interval to reverse bias said rectifier.

4. The combination defined in claim 1 wherein said source of video signals includes a delay line of low impedance to the frequency of said pulse signal connected in series with said rectifier.

5. In a television receiver including a low impedance source of video signals containing vertical and horizontal deflection synchronizing components, apparatus for producing in response to said vertical synchronizing components a vertical deflection waveform having a relatively long scanning interval and a relatively short retrace interval, apparatus for producing in response to said horizontal synchronizing components a horizontal deflection waveform having scanning and retrace intervals of considerably shorter duration than the respective scanning and retrace intervals of said vertical deflection waveform, and a video amplifier stage coupled to a television picture tube, the combination of:

- a rectifier connected between said source of video signals and said video amplifier stage, said rectifier being poled for increased conduction in response to said synchronizing components;
- means biasing said rectifier to normally present a conductive path to said video signals;
- means coupled to said vertical deflection waveform producing apparatus for deriving a first pulse signal during the retrace interval of said vertical deflection waveform;
- means coupled to said horizontal deflection wave form producing apparatus for deriving a second pulse signal during the retrace interval of said horizontal deflection waveform;
- means applying said first pulse signal to the junction of said rectifier and said video amplifier stage for rendering said diode non-conductive to said video signals during the retrace interval of said vertical deflection waveform for causing said video amplifier stage to develop a signal for vertical retrace blanking of said television picture tube; and
- means applying said second pulse signal to the junction of said rectifier and said video amplifier stage for rendering said diode non-conductive to said video signals during the retrace interval of said horizontal deflection waveform for causing said video amplifier stage to develop a signal for horizontal retrace blanking of said television picture tube.

6. The combination defined in claim 5 wherein said source of video signals is of a first relatively low impedance, and said means for applying said first signal to the junction of said rectifier and said video amplifier is of a second high impedance relative to said first impedance whereby said vertical deflection waveform producing apparatus is effectively isolated from said rectifier and from said video amplifier stage during the scanning interval of said vertical deflection waveform, and wherein said means for applying said second pulse signal to the junction of said rectifier and said video amplifier is of a third high impedance relative to said first impedance whereby said horizontal deflection waveform producing apparatus is effectively isolated from said source of video signals and said video amplifier stage during the scanning interval of said horizontal deflection waveform.

7. The combination defined in claim 6 wherein said means for biasing said rectifier includes a source of direct potential and a resistor connected between said source of direct potential and the junction of said rectifier and said video amplifier, said source of direct potential, said source of video signals, said rectifier and said resistor providing a direct current circuit for biasing said rectifier to present a low impedance to the transfer of video signals during the respective scanning intervals of said vertical and horizontal deflection waveforms, the respective ratios of said resistor to said second and third high impedances each being of a value to develop sufficient pulse voltage to reverse bias said rectifier during the respective vertical and horizontal retrace intervals.

8. The combination defined in claim 5 wherein said source of video signals includes a delay line of low impedance to the frequency of said first and second pulse signals in series with said rectifier.

References Cited

UNITED STATES PATENTS

| | | | |
|---|---|---|---|
| 2,917,575 | 12/1959 | Hever | 178—5.4 |
| 2,938,072 | 5/1960 | Macovski | 178—5.4 |
| 3,132,281 | 5/1964 | Sneremy et al. | 315—22 |
| 3,303,282 | 2/1967 | Humphrey | 315—22 |

ROBERT L. GRIFFIN, *Primary Examiner.*

A. H. EDDLEMAN, *Assistant Examiner.*